Sept. 3, 1963 E. A. GERBER 3,102,963

CRYSTAL FREQUENCY STABILIZATION

Filed Oct. 3, 1961

INVENTOR,
EDUARD A. GERBER.

BY Harry M. Saragovitz

ATTORNEY.

United States Patent Office 3,102,963
Patented Sept. 3, 1963

3,102,963

CRYSTAL FREQUENCY STABILIZATION

Eduard A. Gerber, West Long Branch, N.J., assignor to the United States of America as represented by the Secretary of the Army Filed Oct. 3, 1961, Ser. No. 142,742
7 Claims. (Cl. 310—8.9)
(Granted under Title 35, U.S. Code (1952), sec. 266)

This invention described herein may be manufactured and used by or for the Government for governmental purposes, without the payment of any royalty thereon.

This invention relates to frequency control and particularly to crystal control of frequency stabilizing means, operable over a wide temperature range.

There are several means for maintaining a relatively constant frequency in a crystal controlled tuned circuit in a changing ambient temperature. Such means include constant temperature ovens, circuit changes to counteract the change in the crystal frequency, and the use of selected crystal cuts that are, to some extent, self compensating.

The constant temperature ovens, for practical reasons, can only add heat, and must keep the temperature of the crystal above the highest ambient temperature that is to be expected. This requires a comparatively bulky device and takes extra power in the form of heat, which also reduces the life of the crystal since aging is accelerated at higher temperatures.

The circuit changes to counteract the changes in the crystal frequency include the use of other temperature sensitive elements that will produce a change in the circuit frequency equal and opposite to the change in the crystal frequency. These changes include varying the capacity of metallic plates encasing the crystal in proportion to the change in the temperature, which will usually provide a linear compensation. However, this method is comparatively cumbersome, hard to reproduce consistently, and would lack stability. Furthermore, the rate of change of the frequency of the crystal with respect to temperature, may be non-linear rather than linear. In any case, neither of these means compensates for the temperature-frequency error within the crystal itself.

The use of selected crystal cuts involves the choice of an orientation of the crystallographic axis, such as that of the common AT cut, in which the rate of change in frequency with respect to temperature is a minimum over a certain range of frequencies. However, the range of temperatures, over which the frequency is fairly constant is limited; the non-linearity of the curve outside of this range is more exaggerated; and the problem of compensation over a wider range of temperature is even more difficult, if not impossible, by conventional methods.

A very simple and effective method for compensating for the change in crystal frequency with respect to temperature, outside of the range of temperatures, wherein the frequency is fairly constant, is taught in my copending patent application on "Crystal Frequency Stabilization" Serial Number 825,854, filed July 8, 1959, now U.S. Patent No. 3,020,423, granted February 6, 1962. This method includes the addition of means for applying pressure proportional to temperature across one of the axes of the crystal that will produce a compensating change in frequency. The amount and direction of compensation, and the frequency at which it is applied, can be controlled to approximately match the amount and direction of the change in frequency of the crystal. This can extend the frequency compensation in both directions over a fairly wide range. However, the application of pressure by bimetallic means has a comparatively linear function and cannot compensate for the change in frequency with respect to temperature of the crystal in the non-linear ranges.

It is therefore an object of this invention to provide an improved crystal frequency compensating means.

It is a further object of this invention to provide an improved crystal frequency compensating device that provides a linear compensation for the change in frequency of a crystal, with respect to temperature, over a wide range of temperature.

It is a further object of this invention to provide an improved crystal frequency compensating device that can compensate for the non-linear characteristics of the temperature-frequency curve of a crystal.

It is a further object of this invention to provide an improved device for compensating for the change in frequency of a crystal with respect to temperature, that is compact in size; that does not require an external source of power; that can be applied above or below given temperatures and that can produce both increasing and decreasing frequency compensation.

These and other objects are accomplished by providing several bimetallic elements or arms, that apply pressure as a function of temperature, on the periphery of the crystal. The crystallographic axes, across which pressure is applied, is such that the mechanically induced change in frequency is equal and opposite to the change in the frequency of the crystal, with respect to temperature, during the same interval.

The first of a series or group of bimetallic arms is adjusted to engage the edge of the crystal as soon as the frequency of the crystal begins to change. The next of the series of bimetallic arms is adjusted to engage the first bimetallic arm, and to augment its pressure, when the linear increase in the application of pressure by the first arm is not enough to accommodate the non-linear increase in the rate of change of frequency with respect to temperature of the crystal. Additional bimetallic arms may be added within the mechanical limits of the crystal structure to withstand the pressure. Additional groups of bimetallic arms may be positioned to accommodate both the increasing as well as the decreasing portions of the changing crystal frequency characteristics.

This device will be better understood and other and further objects of this invention will become apparent from the following specifications and the drawings of which:

Figure 1:
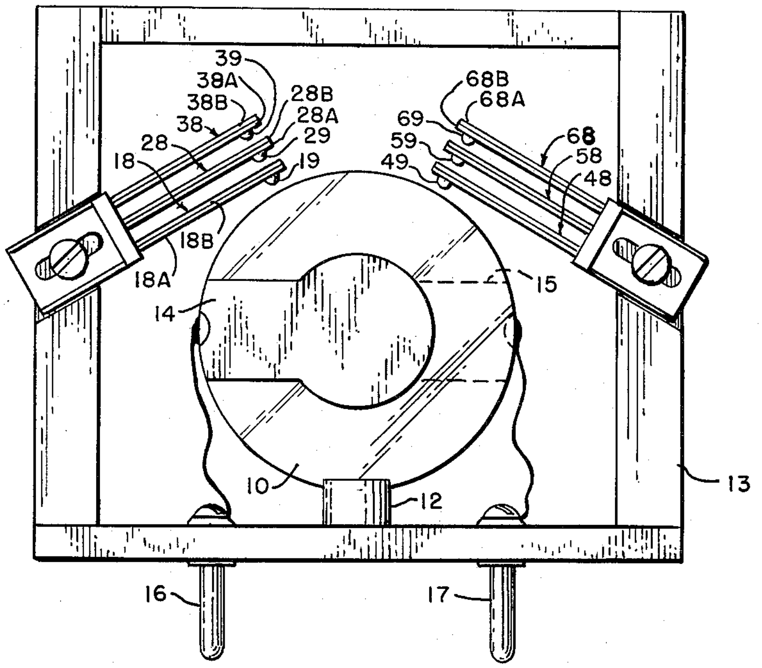
FIGURE 1 is a plan view of a typical crystal and its holder including bimetallic arms for applying pressure across two of the axes of the crystal.

Referring now more particularly to FIGURE 1, a crystal 10 is held in a bracket 12 with terminals 16 and 17 connected to the electrodes 14 and 15. The electrode 15, which is behind the crystal in this view, is shown in dotted lines.

The bracket 12 includes a rigid frame 13 to support the bimetallic arms that apply pressure to the crystal as the temperature changes.

The bimetallic arms 18, 28, and 38 are the elements that supply increasing pressure as the temperature decreases. The bimetallic arms 48, 58 and 68, are the elements that supply increasing pressure as the temperature increases.

Each of the bimetallic arms consists of two strips of metal, labeled A and B for illustration in some of the elements, and numbered to correspond to the various bimetallic arms. These separate metals, A and B, have separate coefficients of expansion and are of a sufficient size and shape to produce the desired mechanical motion and pressure, in response to a given change in temperature, in a well known way. The methods of constructing these bimetallic arms and the metals best suited for this purpose are well known and are described in detail in readily available textbooks and need not be described here.

With one end of each of the bimetallic arms held rigid, the other end will move as the temperature is varied. Since it is necessary in this device that the other end strike a specific point along the edge of the crystal 10, it may be desirable to attach lugs, such as 19, to the bimetallic arms nearest to the crystal. The lugs will concentrate the pressure of the arms on specific points and may be pointed, or shaped to conform to the shape of the edge of the crystal, to provide the most effective application of pressure across the desired axes of the crystal plate.

The other bimetallic arms may have similar lugs 29 or 39 or projections to provide a positive point for the application of pressure along the preceding bimetallic arm. This is desirable, since the pressure of each arm, in turn, must be made effective at a precise temperature.

The bimetallic arms themselves may be used without auxiliary lugs or attachments if the metal itself can be bent or shaped in a form that will apply the correct pressure to the edge of the crystal.

The bimetallic arms 18, 28, and 38 are oriented to move in the same direction as the temperature changes and to provide an increasing pressure on the crystal as the temperature decreases.

The bimetallic arms 48, 58, and 68 are similar to the arms 18, 28, and 38, except that they have their metals reversed with respect to the crystal, or use other metals such that the direction of motion, with respect to the crystal, of these arms, to compensate for the increasing temperature, is opposite to that of the motion to compensate for the decreasing temperature for a given change in temperature. Each of the arms 48, 58 and 68 is oriented to provide increasing pressure on the crystal as the temperature increases.

Figure 2:
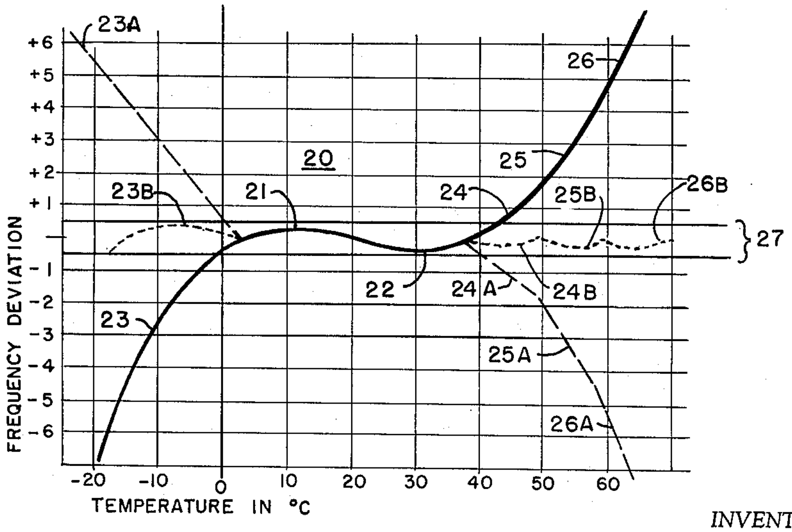
FIGURE 2 shows a typical, frequency-temperature characteristic curve of a crystal, and the effects of pressure compensation on the non-linear portions of this curve.

The effect of the pressure of the bimetallic arms on the crystal can be seen in the graph of FIGURE 2 which plots the frequency deviation of a crystal with respect to temperature. The tolerable frequency deviation is that within the lines 27. The solid curve 20 shows the typical characteristic curve of an AT cut crystal, which has a substantially constant frequency along the portions 21 and 22 of the curve between about 0 and 40 degrees centigrade. However, the frequency drops fairly sharply as the temperature falls below 0 degree and rises fairly sharply as the temperature rises above 40 degrees. In both cases the change in frequency per unit change in temperature is non-linear.

The effect of the pressure of the bimetallic arms is seen in the portions 23 and 24—26 of the curve 20. The effect of a single pressure arm, providing only linear compensation, is shown along the portion 23 of the curve for comparison with the non-linear compensations provided by this invention, shown along the portions 24—26. The linear compensation 23A produces the resultant dotted curve 23B which is only useful, within the tolerable frequency deviation, down to about minus 20 degrees. It would take non-linear compensation to extend the lower, useful, limits below this temperature.

The effect of the non-linear compensation provided by this invention is shown along the portions 24, 25 and 26 of the curve 20. An initial linear compensation 24A is provided by the first of the bimetallic arms 48 as the temperature increases. This produces the resultant, compensated, crystal frequency characteristic shown by the dotted curve 24B.

While the dotted curve 24B is still well within the tolerable frequency deviation, a supplementary, linear compensation 25A is provided by the second of the bimetallic arms 58, acting in combination with the first arm 48, to extend the compensation along the portion of the curve 25.

The resultant, compensated crystal frequency characteristic is shown by the dotted curve 25B.

Similarly, an additional, supplementary, linear compensation 26A is provided by the third of the bimetallic arms 68 to extend the compensation of the crystal frequency characteristic along the portion 26 of the curve, as shown by the dotted curve 26B.

It is obvious that additional bimetallic arms can be added to the series 48, 58, and 68 to increase the rate of the application of pressure at any point where this would be necessary to maintain the crystal frequency within the tolerable limits. In this way the crystal may be precisely and simply compensated for use at temperatures far beyond any that would be possible through the use of conventional, linear compensating means.

It is also obvious that the temperature spacing between the successive applications of pressure can be reduced to an amount where the change in slope of the linear increments approaches that of the true curve as a limit. On the other hand, if a wider frequency deviation is tolerable, the temperature spacing between the successive applications of pressure can be extended to provide a wider temperature range of compensation with fewer bimetallic arms.

It is also obvious that these groups of bimetallic arms can be applied to any of the axes of the crystal across which the application of pressure will produce a change in frequency. More than one point of application of pressure and more than one group of bimetallic arms can be used for compensation in either direction.

It is also obvious that other forms of mechanical support between the crystal and the bimetallic arms can be used, and that other mechanical orientations or alignments of the arms are possible.

In a typical embodiment of this invention, a 29 mc. third overtone, AT cut crystal was used with "Highflex" bimetallic elements manufactured by the H. A. Wilson Company, Division of Engelhard Industries, Inc. All of the bimetallic elements were .33" long, .056" wide, and .031" thick.

Having thus described my invention, what is claimed is:

1. A device for providing non-linear compensation of crystal frequency comprising a crystal, a plurality of lever arms, each having a substantially linear mechanical motion in response to a changing condition, one of said lever arms having its mechanical motion in a given direction along an axis of said crystal and coming in contact with said crystal in response to a certain condition, another of said lever arms having its mechanical motion in said given direction along said axis and engaging said one of said lever arms in response to another condition.

2. A device for providing compensation of the non-linear change in crystal frequency with respect to temperature by means of elements having a linear function with respect to temperature comprising a crystal, a plurality of lever arms each having a linear mechanical motion in response to a change in temperature, said lever arms positioned in series with their mechanical motions along a common axis, a first of said lever arms engaging said crystal at a given temperature, and each successive lever arm engaging the preceding lever arm at successively differing temperatures.

3. A temperature drift compensating device for a crystal comprising a plurality of lever arms each having a substantially linear mechanical motion in response to a change in temperature, said lever arms being positioned adjacent to said crystal and with their mechanical motions along a common axis of the crystal that will produce a change in frequency in response to a change in pressure, one side of a first of said lever arms engaging said crystal at a given temperature, and one side of a second of said lever arms engaging the other side of the first of said lever arms at another temperature.

4. A device for compensating for the change in frequency of a crystal with respect to temperature comprising a crystal mounted in a mechanical holder; a first bimetallic arm mounted on said mechanical holder adjacent to said crystal, having a mechanical motion along a given axis of said crystal in response to a change in temperature, and engaging said crystal at a first temperature; and a second bimetallic arm mounted on said mechanical holder adjacent to said first bimetallic arm, having a mechanical motion along said given axis in response to a change in temperature, and engaging said first bimetallic arm at a second temperature.

5. A crystal frequency drift compensating device comprising a crystal, a first series of bimetallic arms each having a mechanical motion in a given direction in response to a change in temperature, each of said arms positioned in series to engage the preceding arm at a different, successive, temperature; and the first arm of said first series positioned to engage said crystal along a given axis at a given temperature; and a second series of bimetallic arms each having a mechanical motion in another given direction in response to a change in temperature, each of said arms positioned in series to engage the preceding arm at a different, successive, temperature, and the first arm of said second series positioned to engage said crystal along another given axis at another given temperature.

6. A crystal frequency drift compensating device comprising a crystal, a first series of bimetallic elements, each having a mechanical motion in a given direction in response to a change in temperature, and each of said elements positioned, in series, to engage the preceding elements at successive, increasing temperatures; the first element of said first series positioned to apply pressure to said crystal at temperatures above a first given temperature; a second series of bimetallic elements, each having a mechanical motion in another given direction in response to a change in temperature, and each of said elements positioned, in series, to engage the preceding element at successive, decreasing temperatures; and the first element of said second series positioned to apply pressure to said crystal at temperatures below a second given temperature.

7. A crystal frequency drift compensating device comprising a crystal, a plurality of groups of bimetallic arms, each having a plurality of bimetallic elements, each having a mechanical motion in response to a change in temperature; all of the elements of a first of said groups being positioned with their mechanical motions in series and in a first direction in order that each of the elements engages the preceding element at different, successive, increasing temperatures, the first element of said first group being positioned to apply pressure to said crystal in said first direction at temperatures above a first temperature; all of the elements of a second of said groups being positioned with their mechanical motions in series and in a second direction in order that each of the elements engages the preceding elements at different, successive, decreasing temperatures; and the first element of said second group being positioned to apply pressure to said crystal at temperatures below a second temperature.

No references cited.